United States Patent
Ruelke (10) Patent No.: US 6,459,889 B1
(45) Date of Patent: Oct. 1, 2002

(54) DC OFFSET CORRECTION LOOP FOR RADIO RECEIVER

(75) Inventor: Charles R. Ruelke, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/515,288

(22) Filed: Feb. 29, 2000

(51) Int. Cl.[7] .............................................. H04B 1/10
(52) U.S. Cl. .................. 455/296; 455/234.1; 455/324; 455/303; 330/129; 330/278
(58) Field of Search ........................... 455/324, 296, 455/310, 232.1, 234.1, 234.2, 239.1, 303; 341/118, 155; 330/129, 141, 279, 281, 278

(56) References Cited

U.S. PATENT DOCUMENTS

| | | | |
|---|---|---|---|
| 4,653,117 A | 3/1987 | Heck | 455/209 |
| 5,079,526 A | 1/1992 | Heck | 332/127 |
| 5,469,115 A * | 11/1995 | Peterzell et al. | 330/129 |
| 5,483,691 A | 1/1996 | Heck et al. | 455/234.2 |
| 5,584,059 A | 12/1996 | Turney et al. | 455/126 |
| 5,617,060 A * | 4/1997 | Wilson et al. | 330/129 |
| 5,617,473 A | 4/1997 | Wietecha et al. | 379/399 |
| 5,789,974 A | 8/1998 | Ferguson, Jr. et al. | 330/2 |
| 5,893,029 A | 4/1999 | Bastani | 455/324 |
| 5,898,912 A * | 4/1999 | Heck et al. | 455/226.1 |
| 6,006,079 A | 12/1999 | Jaffee et al. | 455/310 |
| 6,166,668 A * | 12/2000 | Bautista et al. | |
| 6,225,848 B1 * | 5/2001 | Tilley et al. | 327/307 |
| 6,240,100 B1 * | 5/2001 | Riordan et al. | 370/347 |
| 6,317,064 B1 * | 11/2001 | Ferrer et al. | |
| 6,321,073 B1 * | 11/2001 | Luz et al. | 330/278 |

* cited by examiner

Primary Examiner—Vivian Chin
Assistant Examiner—Sujatha Sharma
(74) Attorney, Agent, or Firm—James A. Lamb (57) ABSTRACT

A receiver direct current offset correction loop (DCOCL) circuit digitizes the baseband analog control voltage (148) using an Analog-to-Digital Converter (ADC) block 160, which is then processed at control block (162) to drive compensation circuitry 164 in a classic feedback configuration. The DCOCL is augmented by an independent automatic gain control (AGC) circuit that utilizes the same control signal (148). The AGC circuit includes a multiplicity of adjustable gain stages (114, 118, 158) with threshold and characteristic response that is controlled by AGC control block (122). Both the AGC and DCOCL circuits are dynamically configured for optimum complimentary operation via the microprocessor (236) depending on the receiver's operating environment and protocol requirements. Subsequent direct current (DC) voltage drift is detected by the digital signal processor (DSP) block (230) which in turn flags the microprocessor to reinitiate the correction sequence when needed. Subsequent to the microprocessor controlled hardware correction sequence, the DSP digitally equalizes any remaining offset errors in the recovered data through a multiplicity of compensation algorithms optimized to specific operating environments. This provides for optimum correction of the baseband DC offsets with minimal degradation of receiver performance.

22 Claims, 6 Drawing Sheets

DC OFFSET CORRECTION LOOP FOR RADIO RECEIVER

CROSS REFERENCE TO RELATED DOCUMENTS

This application is related to patent application Ser. No. 09/515,286 by Tilley, et al., entitled "Method and Apparatus for Settling and Maintaining a DC Offset," which is a continuation-in-part of pending application Ser. No. 09/290, 564 filed Apr. 13, 1999, Tilley, et al., entitled "Method and Apparatus for Settling a DC Offset," and also related to patent application Ser. No. 09/515,843 by Tilley, et al., entitled "Enhanced DC Offset Correction Through Bandwidth and Clock Speed Selection," and Ser. No. 09/515,834 by Ferrer, et al., entitled "DC Offset Correction Adaptable to Multiple Requirements," filed concurrently herewith, assigned to Motorola, Inc., and incorporated herein by reference.

FIELD OF THE INVENTION

This invention relates generally to radio communication receivers, and more specifically to a radio communication receiver incorporating DC offset correction loops for Zero IF or Direct Conversion architectures.

BACKGROUND

DC offset receivers and Zero IF receivers are discussed generally in U.S. Pat. No. 4,653,117 issued in March 1987, to Heck, U.S. Pat. No. 5,079,526 issued in January 1992, to Heck, et al.; in U.S. Pat. No. 5,483,691 issued in January 1996, to Heck, et al.; in U.S. Pat. No. 5,893,029 issued in April 1999 and in U.S. Pat. No. 6,006,079 to Jaffee et al. issued in December 1999, which are hereby incorporated by reference.

Direct Conversion Receivers (DCR) or Zero IF (ZIF) architectures function by mixing the desired RF or IF signal down to baseband, or some very low frequency offset from DC. Therefore, by definition for DCR or ZIF receivers, the mixer's Local Oscillator (LO) frequency is approximately equal to the desired input RF frequency. Thus, the magnitude of the baseband DC signal is proportional to that portion of the RF signal that is exactly equal to the LO frequency. Any variations in RF power due to environmental (fading, multipath) or circuit functionality (AGC, mixer LO-to-RF isolation) will affect the Direct Current (DC) voltage level at baseband. It is important for the optimum performance of the receiver that variations in the baseband DC are compensated. This implies a need for a Direct Current Offset Correction Loop (DCOCL) which can unobtrusively compensate for any DC variations in the baseband signal path.

The baseband signal path may include a parallel I and Q channel configuration, where the Q signal is 90° out of phase with 1. Great effort is usually expended to maintain symmetry between the I and Q channel circuitry in order to minimize distortion products that result from amplitude or phase imbalances between the respective paths. This is especially true for analog modulation schemes, where distortion products cannot be eliminated through DSP arithmetic manipulation such as forward-error correction, or auto-correlation techniques. Each I and Q channel often includes a differential baseband path (I and $\bar{I}$, Q and $\bar{Q}$), where I/$\bar{I}$ and Q/$\bar{Q}$ maintain a 180° phase relationship to enhance common-mode noise immunity. Any DC offset between I and $\bar{I}$, or Q and $\bar{Q}$ signals, is interpreted as a shift in the intrinsic DC for the I and Q channels respectively.

If the DC shift is severe enough, any demodulation technique (digital or analog) which requires an accurate reference for the I and Q signals will be degraded. Furthermore, severe DC shifts within the baseband path can impact circuit performance, degrading the selectivity of the baseband active filters, minimizing the AGC-free dynamic range, and even "railing" the I/Q signal against the baseband bias limits. This can be further complicated by the finite isolation between RF and Local Oscillator (LO) signals in the down mixers of many real world Zero IF (ZIF) or Direct Conversion Receivers (DCR). This finite isolation can cause the LO to mix with itself creating a baseband voltage proportional to the LO to RF isolation. This phenomenon has historically complicated ZIF design implementations since baseband DC offsets created in this manner vary with mixer performance over temperature, gain and LO drive level.

The continuously tracking closed loop offset correction strategies (which continuously track out DC variations) afford the advantage that all variations in DC voltages are continuously tracked out in real time, continuously "centering" the I/Q signal thus providing maximum AGC-free dynamic range of the baseband path. The disadvantage of a continuously tracking closed loop strategy is that it effectively introduces a High Pass Filter (HPF) response into the baseband filter response by tracking out all baseband signal variations below the DCOCL loop bandwidth. This high pass filter response induces an equivalent "notch" in the ZIF equivalent passband. The notch effectively "nulls out" FM Bessel components of the desired RF signal that are equal to the local oscillator frequency, thus causing distortion in the time domain demodulated signal. While these distortion products could easily be accommodated in digital modulation protocols, constant envelope analog modulation (FM, PM, etc) is seriously distorted by this "notch effect".

U.S. Pat. No. 5,079,526 by Heck et al, attempts to address this condition by phase-locking the LO (the LO defines the notch location in the ZIF pass band) to the RF signal at a known LO-to-RF offset. The offset is selected to minimize any distortion products; however, the notch still exists and it becomes very cumbersome to effectively optimize the LO-to-RF offset for all operating environments.

U.S. Pat. No. 5,483,691 by Heck et al. optimizes AGC performance in a ZIF system to the exclusion of integrating the functionality into secondary loops unrelated to AGC. So, a need exists for an "optimized" digital DCOCL methodology integrating AGC and DC offset correction functionality that can be initiated on an "as required" basis. Such a method will provide elimination of a passband notch while maintaining an accurate baseband DC voltage. This in turn provides optimum performance for both analog FM and digital protocols.

Thus, there is a need for a baseband DC offset correction method which can be universally applied to ZIF and Direct Conversion receivers in a manner which is minimally disruptive of normal communications without the negative effects of the characteristic ZIF passband notch produced by continuously tracking out DC offset variations and without the RF to LO isolation issues of previous designs.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

While this invention is susceptible of embodiment in many different forms, specific embodiments are shown in the drawings and will herein be described in detail, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

An embodiment of the present invention provides a method that is optimized to provide correction of any DC offset voltage errors in the baseband signal path based on the particular operating environment of a ZIF or DCR receiver. The operating environment of the receiver is partitioned into two main categories: deterministic slotted protocol operation and non-slotted random operation. For slotted system operation, the AGC and DCOCL are strategically configured to accommodate the particular protocol in which the receiver is operating with minimal disruption of normal communication. If the receiver is operating in a non-slotted environment where the reception of RF signals is random, then a different methodology is utilized that takes advantage of simultaneous AGC and DCOCL functionality. In each case, the offset is ultimately corrected in hardware by applying an appropriate compensating DC voltage to the signal path. Complementing this hardware methodology, a multiplicity of DSP algorithms are described that can be employed to compensate the I and Q to arithmetically equalize any residual offsets after execution of the hardware correction. This arithmetic correction takes place in the digital signal processing, for example, as used in decoding, digital filtering, etc.

The present invention, in one embodiment, uses a Sample and Hold DCOCL strategy which adopts an event-initiated correction with finite duration that is subsequently "fixed" until future corrections are initiated. Because this strategy uses one-time compensation, the difficulty with this strategy is in determining when to initiate the correction sequence. In general, the longer the time between the last baseband DC offset correction and reception of the received signal, the greater the probability that DC drift will have occurred, thus degrading receiver performance. Ideally, initiating a correction just before receiving a signal would ensure optimum performance. For slotted protocol applications (TDMA, FDMA, slotted PSK, etc) this is feasible, as the received signal is deterministic based on the communication protocol. But for classic two-way dispatch operation where message timing is completely random, it is impossible to know apriori when an incoming message is about to be received.

One method to address this problem is to initiate a correction sequence periodically, whether needed or not, to ensure proper operation. This brute-force approach will unnecessarily increase processing requirements for the receiver's controller(s) (e.g. microprocessor, DSP, etc.), which is undesirable. This is especially true as sophisticated multi-mode, multi-band radios are developed with High Speed Data (HSD) applications which intrinsically increase microcomputer processing demands. Furthermore, since AGC operation affects the DC offset error being corrected, it becomes desirable to integrate the functionality of the AGC into the offset correction sequence to ensure proper offset correction results.

Figure 1:
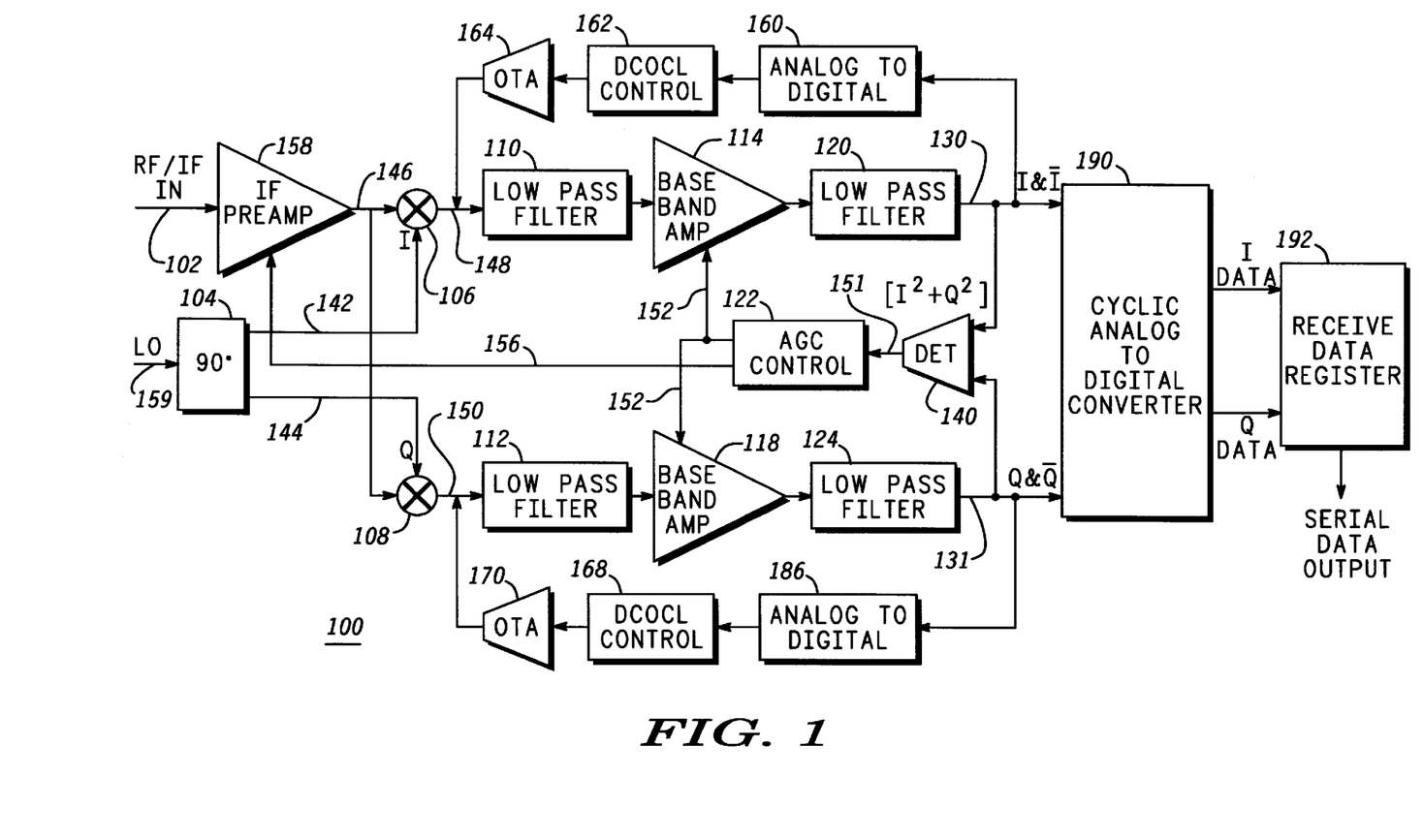
FIG. 1 is a block diagram of a Zero IF receiver circuit in accordance with an embodiment of the present invention.

Referring now to the drawings and specifically to FIG. 1, there is shown a simplified block diagram of a ZIF receiver system 100 utilizing an Automatic Gain Control (AGC) system and a DC Offset Correction Loop in accordance with one embodiment of the present invention. The AGC system of the present invention includes a set of adjustable gain baseband amplifiers 114 and 118, an adjustable gain IF pre-amplifier 158, and an AGC control circuit 122 for controlling the gain of the various amplifiers in the receive path (including RF, IF and baseband amplifier stages).

A first amplifier stage (generally a low noise amplifier), such as a gain adjustable IF pre-amplifier 158, receives a radio frequency (RF) or intermediate frequency (IF) signal 102, which it amplifies to produce signal 146. This amplified signal at 146 is applied to down-mixers 106 and 108. A phase-shifting circuit 104 receives a local oscillator (LO) signal 159 and produces an in-phase signal (I) 142 and a quadrature signal (Q) 144 (The (I) 142 and (Q) 144 signals being 90 degrees out of phase with respect to each other.).

The (I) 142 and (Q) 144 signals are applied to down mixers 106 and 108 for mixing with the input signal 146 from IF preamplifier 158. Down mixers 106 and 108 then convert the signals from the RF or IF to baseband signals 148 and 150. It should be noted that all RF or IF, LO and baseband signals may include differential signal pairs to provide maximum common mode noise rejection. For clarity, only a single signal path representing each of the differential signal pairs is shown. For example, baseband signal 148 and 150 may be composed of I and $\bar{I}$, Q and $\bar{Q}$ respectively, where I and $\bar{I}$ are 180° out of phase with each other, and $\bar{Q}$ is 180° out of phase with signal Q. Lowpass filters 110, 112, 120, and 124 filter the baseband signals 148 and 150 to remove interference and limit the noise bandwidth of the receiver 100. Lowpass filters 110, 120, and 112, 124 are distributed along the baseband I and Q channels respectively, and may be interactively programmable. Variable gain stages 114 and 118 separate each filter stage (additional gain stages and/or filtering stages may also be present, but are not shown), preferably with at least one of the baseband gain stage pair 114 and 118 being under gain control by a control circuit such as AGC control circuit 122. The analog differential filtered signals 130 and 131 are sampled by the Analog-to-Digital Converter 190 for further processing and demodulation. I and Q data samples are then placed in a receive data register 192 to produce a stream of serial data output (generally to a digital signal processor).

The filtered baseband analog signals 130 and 131 are processed through an AGC detector (DET) 140 to provide control voltage 151. The control voltage 151 is then used by the AGC control block 122 to generate operational dependent response voltages 152 and 156 to control the gain response of gain blocks (amplifiers) 114, 118 and 158. The baseband gain of amplifiers 114, 118 and RF/IF preamplifier 158 can be independently adjusted based on the selected response programmed into AGC control block 122. Baseband signals 130 and 131 (I and Q) also are processed by analog-to-digital converters 160 and 186 for subsequent use by the DC offset control blocks 162 and 168. The DCOCL Control blocks 162 and 168 set voltages generated by the Operational Transconductance Amplifiers (OTA) 164 and 170 respectively. The output voltage of the OTAs set differential DC offset voltages of the baseband signals 148 and 150 to produce the minimum DC offsets of the filtered baseband signals 130 and 131, respectively. The characteristic response of the DCOCL control blocks 162 and 168 can be selected by the radio's microprocessor or microcontroller (not shown) from a series of deterministic sequences including one-time single event corrections, or continuous "closed loop" corrections.

Since the control signals 130 and 131 are utilized by the AGC and DCOCL circuits, the AGC can be indirectly controlled by the DCOCL to provide for simultaneous operation of the AGC and DC offset correction for optimum operation during baseband correction for certain receiver operating environments.

The present invention can be utilized in either a slotted (deterministic) protocol communication environment or a non-slotted (non-deterministic) environment. In a slotted (deterministic) protocol, the receiver operation is synchronized with the received signal. In such a slotted system, there are generally time slots when either (1) no information is being transmitted to the receiver of interest, or (2) information being received by the receiver is irrelevant, or (3) information can otherwise be discarded without consequence or with minimal consequence. The present invention takes advantage of any such periods in the protocol to perform baseband DC offset correction in a minimally disruptive manner. An example of this type of communication is in TDMA (time division multiple access) communication systems.

In non-slotted (non-deterministic) systems, the receiver has no advance knowledge of when it might receive a transmission. An example of this type of system is a conventional AMPS (Advanced Mobile Phone Service) analog cellular telephone environment or a simplex two way radio environment wherein a communication can take place at any time. Since the baseband DC offset correction process disrupts the receiver's ability to receive incoming transmissions during the period of the Offset correction, different strategies are used for each communication environment. Embodiments of this invention effectively utilize AGC control and DCOCL control to coordinate the correction of the baseband DC offset in the radio receiver.

Figure 2:
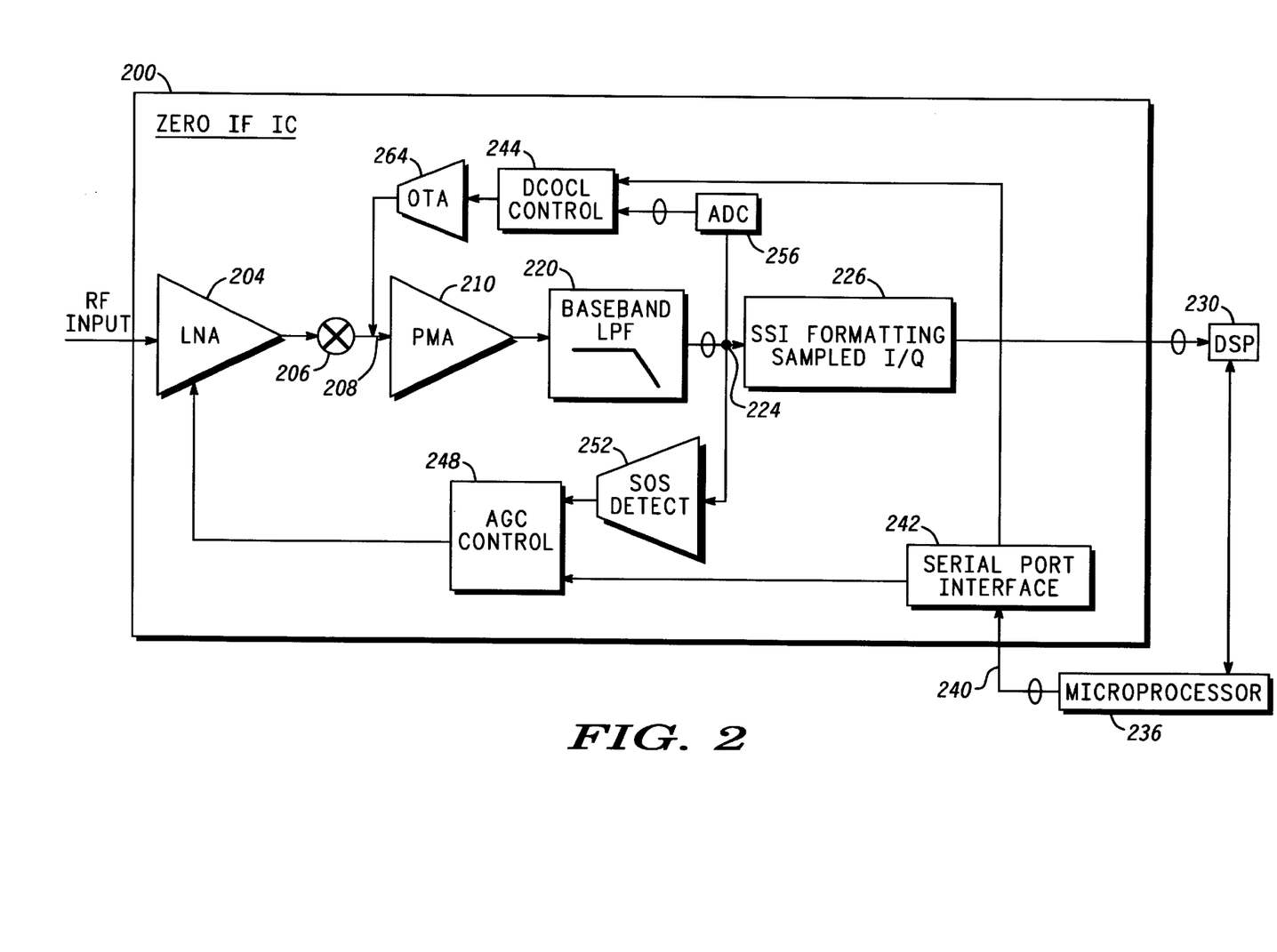
FIG. 2 is a block diagram of a system architecture including the Zero IF receiver integrated circuit, digital signal processor, and microprocessor controller in accordance with an embodiment of the present invention.

Referring now to FIG. 2, a simplified general system block diagram is shown illustrating the interface of receiver 100 to digital signal processing and microprocessor control stages.

FIG. 2 is a general system block diagram illustrating how receiver 100 may be interfaced to subsequent signal processing and control subsystems of the radio receiver. In the preferred implementation, an integrated Zero IF integrated circuit (ZIF IC) receiver subsystem 200 provides the functionality described in connection with FIG. 1. Those of ordinary skill in the art will appreciate that although this invention is illustrated in the context of a Zero IF system, the invention is equally applicable to Direct Conversion Receivers. In this illustration, the duplicated circuitry used to separately process I and Q has been represented in simplified form to show the broad functionality. RF input signals are received by a low noise amplifier (LNA) 204 and passed to mixer 206 for down-conversion to baseband. The output 208 of mixer 206 includes the differential baseband I/Q signals. The I/Q signals are presented to the PMA (Post Mixer Amplifier) 210 (which performs the function of providing low noise gain to enhance baseband signal to noise ratio) prior to baseband low-pass filtering at filter 220. The output of filter 220 is a filtered differential baseband I/Q signal having an intrinsic DC component. Analog signal 224 is formatted into an industry standard 3 line SSI (Synchronous Serial Interface) operating at a predetermined sampling rate (for example, 24 Ksps) at interface 226 for coupling to an external digital signal processor (DSP) 230. The three line SSI signal includes clock, data and frame synchronization information representing the I and Q signals and AGC or other pertinent information.

DSP 230 can be any suitable commercially available, custom or semi-custom digital signal processor chip. DSP 230 functions to perform Quadrature demodulation, RSSI calculation, and DC averaging of the I and Q signals as will be discussed later. DSP 230 is interfaced to a controller 236 which may be a microcomputer, a microcontroller, ASIC or other suitable control processor. Controller 236 is used for a variety of purposes in the receiver. For purposes of this invention, it carries out the functions of initiating baseband DC offset correction sequences based upon the information received from DSP 230 via a parallel interface (e.g. eight bit parallel) therewith.

Controller 236 is coupled to the Zero IF IC 200 via a three line Serial Port Interface (SPI) bus 240 coupled to Serial Port Interface block 242, in the preferred implementation. The SPI is typically a three line interface incorporating data, clock and chip enable signals to control both the DCOCL and the AGC. The information carried in the three line interface 240 is coupled through SPI 242 to a DCOCL control block 244 and an AGC control block 248. AGC control 248 also receives a measure of the signal strength from "sum-of-squares" (SOS) detector 252 which monitors the signal at 224. Similarly, an analog to digital converter (ADC) 256 supplies feedback from 224 to DCOCL control 244. DCOCL control 244 provides output to an OTA (operational transconductance amplifier) 264 which provides a DC correction at the mixer output 208. The AGC control 248 acts directly on the LNA 204 to adjust the gain/attenuation supplied by this amplifier.

It should be noted, at this point, that there are two control loops in action in this embodiment—the AGC control loop and the DC offset correction loop. Both loops derive input from the filtered differential baseband signal and the Controller 236 and apply correction at 204 and 208, respectively. The DCOCL is thus nested within the AGC control loop and they are interdependent. That is, a change in the DC offset can affect the AGC and vice versa.

In operation, the DCOCL operates as follows. Under control of controller 236, the DCOCL control 244 initiates a correction to the baseband DC offset when instructed by the controller 236. This process may be initiated under a variety of circumstances; however, in the preferred embodiment, the process is initiated at two times. The first is when the receiver is first turned on. The second is whenever the DC offset exceeds a predetermined threshold. In the preferred embodiment, this threshold depends upon the correction resolution as set by the OTA 264—that is, the resolution of DC output voltages which can be supplied by the OTA 264. For example, a correction can be initiated whenever the baseband DC offset exceeds twice the DC equivalent value of the Least Significant Bit (LSB) of the ADC 256. (Note that the resolution of output of the OTA 264 can be mapped to the resolution of ADC 256.) It should be noted that the threshold setting of twice the DC equivalent value of the LSB of ADC 256 is suitable to the present implementations, but, other threshold settings may be equally suitable to other implementations.

When the baseband DC offset exceeds this threshold, the DCOCL control 244 is instructed by the controller 236 to initiate a baseband DC offset correction sequence. The offset correction sequence can utilize a binary search routine such as that described in U.S. patent application Ser. No. 09/515,286 to Tilley, et al., entitled Method and Apparatus for Settling and Maintaining a DC Offset, assigned to Motorola, Inc. and filed concurrently herewith, and to it's parent application Ser. No. 09/290,564 filed Apr. 13, 1999, entitled Method and Apparatus for Settling a DC Offset, assigned to Motorola, Inc., which are hereby incorporated herein by reference. As described in these references, the offset correction sequence could also be initiated by several possible factors, such as temperature, as well as the preferred change in DC offset.

Several possible averaging algorithms can be used by DSP 236 (or other devices in other architectures) to determine the current level of baseband DC offset correction and thereby determine whether or not to initiate a baseband DC offset correction sequence. These averaging algorithms fall into at least four groups and may depend upon the protocol being used according to the mode of operation of the receiver. The four groups are as follows:

1) Simple Integration. In this process, which is the system default, the I and Q signal values are sampled and their values are simply averaged over a predetermined period of time by dividing by the number of samples.

2) Envelope averaging. In this process, I and Q samples which fall within particular upper and lower value ranges are averaged independently over a specified period of time. This produces an upper limit average and a lower limit average. After this period of time, a cumulative average is calculated using the relationship:

Total Average=(Upper Limit Average+Lower Limit Average)/2.

This technique is particularly well suited for slow data rate digital signaling systems such as trunking control channels, Digital Private Line (DPL)™ (trademark of Motorola, Inc.) and other low speed data applications.

3) Slotted Time Averaging. In this technique, I and Q samples are taken from a finite number of N intervals of time in which the desired received signal is known to be absent. The I and Q data for each interval is then independently averaged to produce N interval averages. After this is done, the Total Average is computed as follows:

$$\text{Total Average} = \frac{\sum \overline{X_n}}{N}$$

where=$\overline{X_n}$ the I and Q averages for the interval n; and where N=the number of intervals.

This technique is particularly well suited for TDMA protocols where eliminating the carrier for the averaging calculation is highly desirable because momentary increases in the received bit error rate (BER) may result when arithmetically tracking out the average I and Q values in DSP processes (such as demodulation, filtering, etc.).

4) Weighted Average—In this technique, individual I and Q samples may be weighted based upon a predetermined function. For example, greater weight can be given to samples closer to the previously calculated average. The weighted samples can then be averaged over a fixed period of time.

Those of ordinary skill in the art will appreciate that the above averaging techniques can be used independently or in any combination as might be advantageous to a particular system. Those of ordinary skill in the art will also appreciate that other averaging techniques can be devised without departing from the present invention.

Figures 3, 3A:
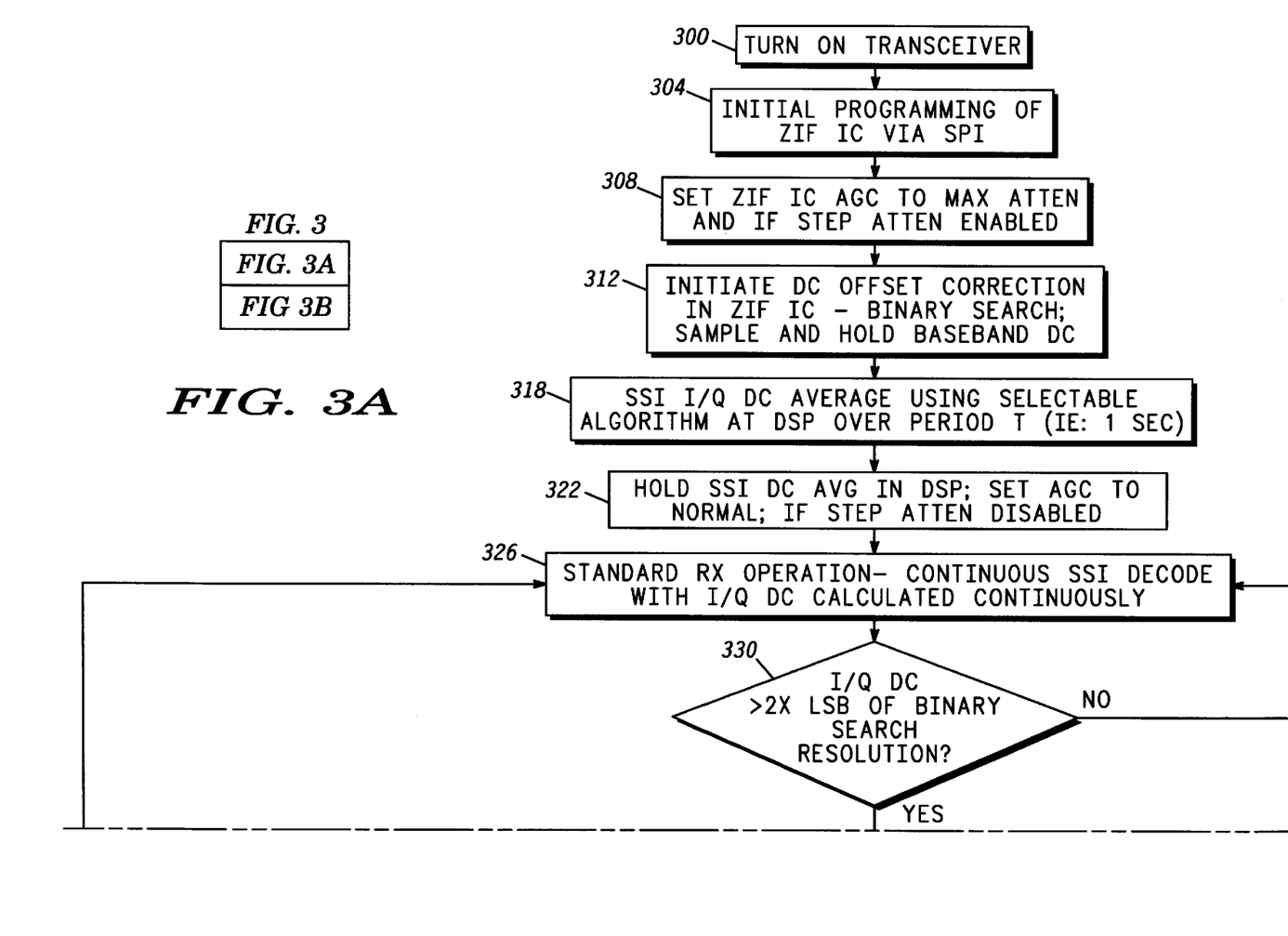
FIG. 3 is a flow diagram describing a method according to the present invention for conducting DC offset correction in accordance with one of two possible operational modes of the receiver of an embodiment of the present invention.
Figure 3B:
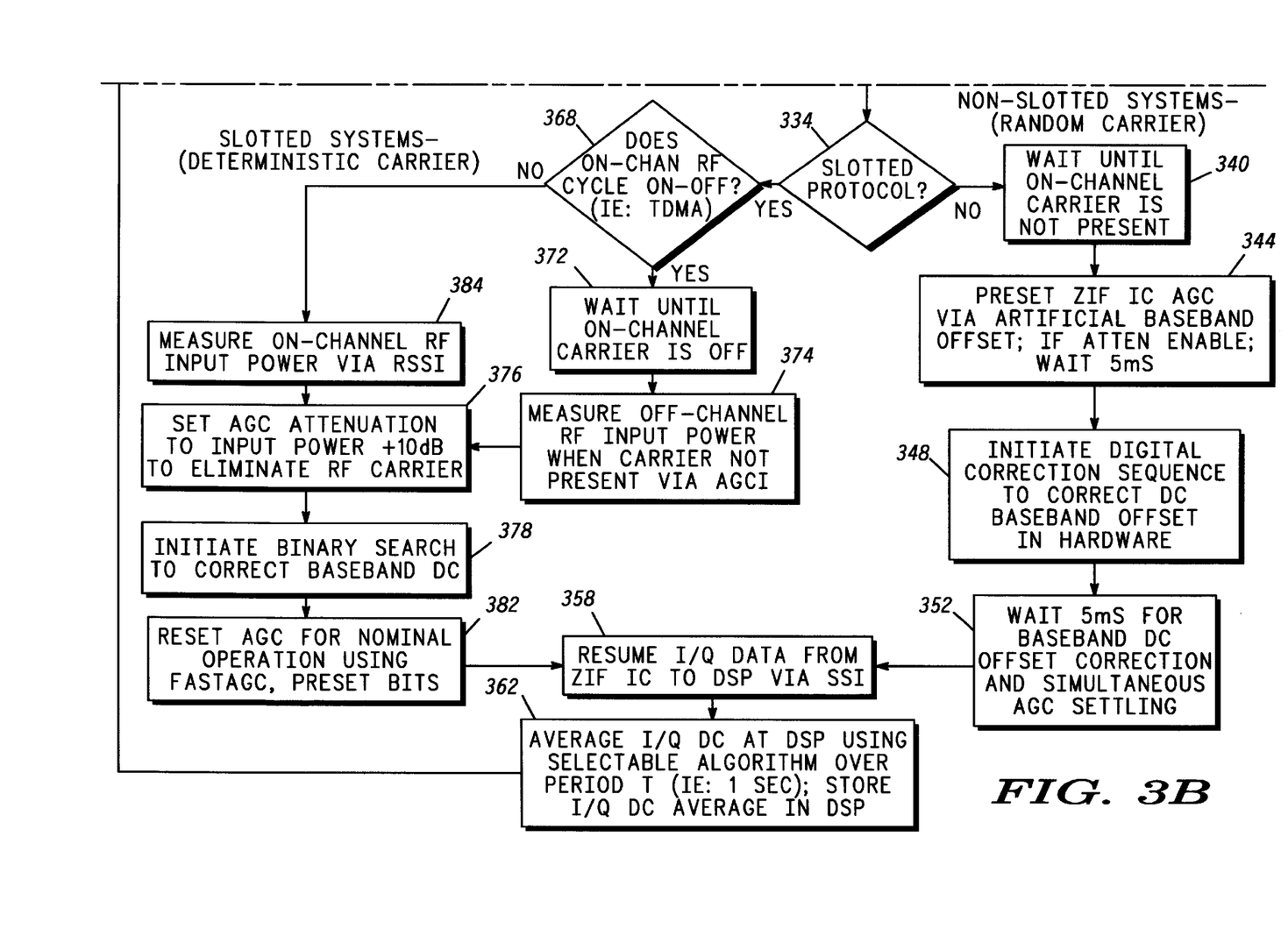

Referring now to FIG. 3, a flow diagram illustrates the decision logic and sequence for determining which AGC and DC correction sequence is utilized and how each sequence is initiated according to the preferred implementation. The processing depicted in this diagram takes place in the controller 236 in this embodiment, but those of ordinary skill in this art will understand that this can be implemented using a variety of control configurations.

In FIG. 3, the process begins at 300 with the powering up of the receiver, which may generally form a part of a radio transceiver. At 304, the ZIF IC 200 receives its initial programming via 240 from controller 236. This initial programming initializes all of the ZIF IC subsystems for normal operation. At 308, the ZIF IC is instructed to set the AGC to maximum attenuation. In the present embodiment, this can be accomplished in steps of 0.3 dB for the receiver front end, 3 dB for the baseband amplification and 15 dB for the IF section. However, the important thing is that any incoming signal be eliminated by producing adequate signal attenuation.

At 312, the baseband DC offset correction sequence is initiated utilizing, for example, the binary search algorithm. At 318, the I/Q DC average is computed at the DSP 230 (or, in the alternative, at controller 236) over a specified time period (for example, one second) and arithmetically compensates for any residual DC offset in I and Q data. This averaging also determines the initial DC reference for the I and Q baseband signals for use in block 330. The I and Q average may also be used as a reference value in any arithmetic operations which need a DC reference (such as, for example, demodulation, filtering, frequency control, etc.). In the current architecture, such operations are carried out in the DSP 230.

This computed average is held in the DSP 230. The AGC is set to normal operation, and the signal attenuation is disabled at 322 completing the DC offset correction sequence. At 326, the receiver operates in its standard mode of operation with the I and Q DC average being computed by the controller 236 (or DSP 230). The DSP's DC offset value is held constant at the computed value determined by the initial DC offset averaged in block 318. This DC offset is held until a programming event determines that a new baseband DC offset correction sequence is to be initiated. In the preferred embodiment, this programming event is the determination that the baseband DC offset has drifted (e.g. due to temperature, oscillator drift, or other factors) so that the offset now exceeds a predetermined threshold value. This threshold can be, for example, twice the minimum resolution of ADC 256 or equivalently twice the least significant bit of ADC 256. If this threshold is not exceeded at 330, standard radio operation continues. If this threshold is exceeded at 330, a determination is made as to the receiver's operational environment at 334.

The first determination made in identifying the receiver's operational environment is determining whether the receiver is operating using a slotted or non-slotted protocol (i.e. a deterministic or non-deterministic protocol, respectively) at 334. If the receiver is using a non-slotted protocol at 334, the controller 236 waits until no on-channel carrier is present at 340. This is done to minimize the chances that the DC offset correction sequence will disrupt receipt of an incoming message to the user. The controller 236 then presets the ZIF IC to engage a predetermined amount of artificial DC baseband offset. The amount required is simply enough to cause the AGC to fully engage a maximum amount of attenuation at 344. In this scenario, the DC offset is artificially set and the AGC responds due to the nested loop nature of the architecture. The DC offset correction process then waits for a predetermined period of time (for example, 5 milliseconds) to permit the receiver to settle to a quiescent state.

At 348, the controller 236 initiates the baseband DC offset correction sequence to correct the DC baseband offset in hardware (that is, by application of a compensating DC level by OTA 264) at 348 using, for example, the binary search algorithm. The process then waits (for example, for 5 milliseconds) for the DC offset correction and AGC to simultaneously settle out at 352. The receiver now resumes I/Q data receipt from the ZIF IC 200 at 358 with data being supplied to the DSP 230 from interface 226. The DSP computes the average I and Q values using an appropriate algorithm as described earlier over a predetermined time period, for example, one second. This new I/Q average DC value becomes the new reference value for use at block 330 and is stored at 362. The new value is also used by DSP 230 for standard receiver operations at 326 such as demodulation, filtering, and other such arithmetic functions relying upon an accurate DC value.

If a slotted protocol is being used at 334, the next determination made is a further categorization of the nature of the protocol. At 368, it is determined whether or not the on-channel RF signal cycles on and off in this protocol (as, for example, in TDMA). If so, the system takes advantage of this to minimize or eliminate the likelihood of interfering with a communication by selecting a time when there is no on-channel RF to do the DC offset correction. If the on-channel RF cycles on and off at 368, the system waits at 372 until the on-channel carrier is off. The off-channel RF input power is then measured at this time at 374. This can be determined, for example, from the AGC circuit. Control then passes to 376, where the AGC is set to attenuate the input RF power by an appropriate amount to eliminate the signal for practical purposes. For example, the AGC can be set to attenuate the RF by an amount equivalent to the RF input plus 10 dB (for example) so that the signal is eliminated for all practical purposes relating to this invention. Alternatively, the AGC could simply increase the attenuation by the maximum amount, however, this might increase the settling time when the AGC is reset.

Once the RF input is eliminated, control passes to 378 where a binary search is initiated to correct the baseband DC offset. The AGC is then reset (preferably using a fast reset algorithm) at 382 and control passes to 358. After the process of 358 and 362, standard receiver operation resumes at 326.

If, at 368, the on-channel RF does not cycle on and off, a slightly different approach is taken. The on-channel RF input power is measured (e.g. by the RSSI—Received Signal Strength Indicator, AGC or any other suitable technique for measuring signal strength) at 384. The AGC attenuation is then set to eliminate the on-channel signal at 376 and the process proceeds as in the previous example.

Figure 4:
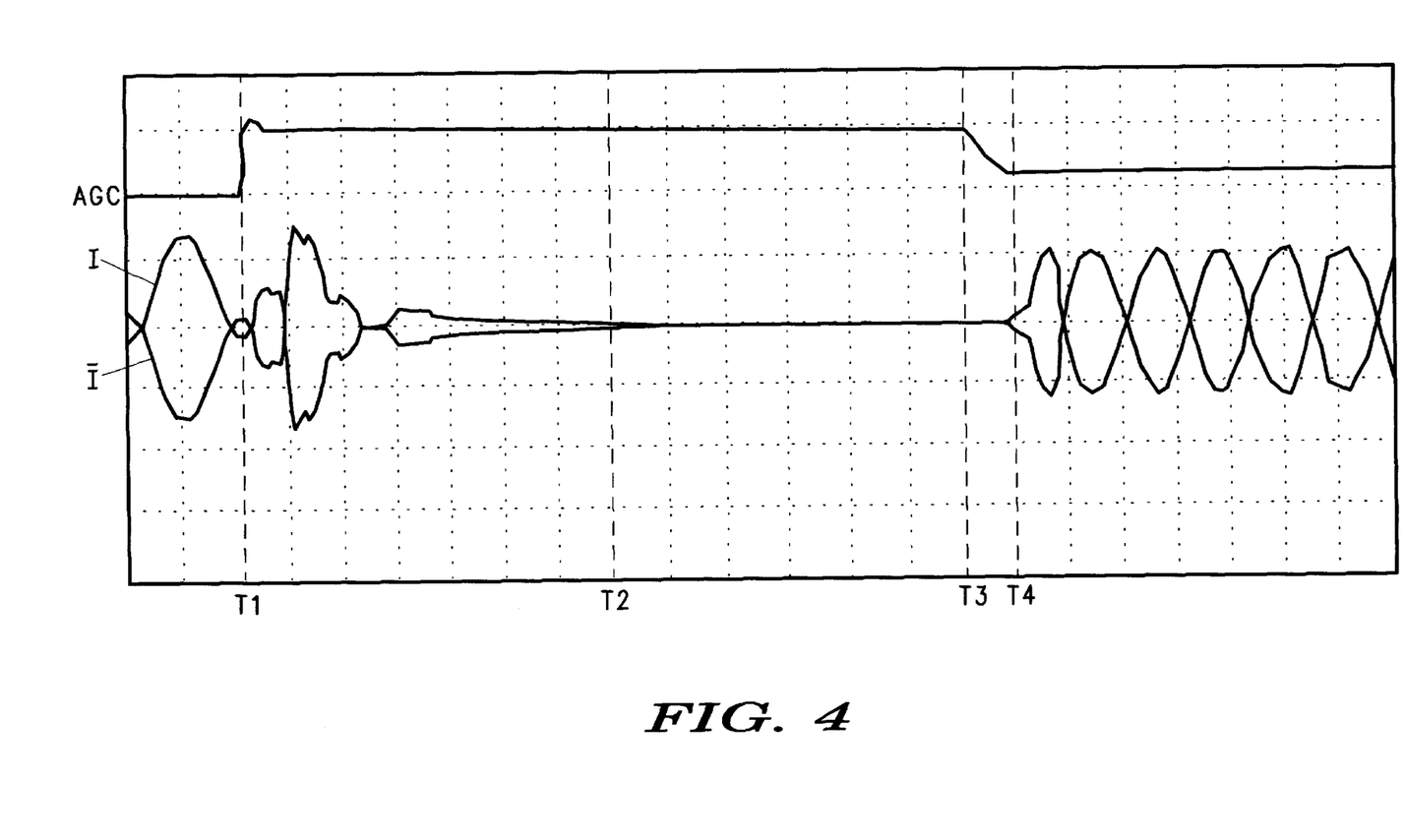
FIG. 4 shows a characteristic response for a prototype DCOCL and AGC for slotted protocol receiver operation.

FIG. 4 is a characteristic response of I and $\bar{I}$ (I shifted by 180 degrees) signals undergoing a DCOCL DC voltage correction and the corresponding AGC response for a slotted protocol correction. The AGC and DCOCL corrections are independently controlled via the controller 236. In this chart, the I and $\bar{I}$ signals initially exhibit a distortion which is characteristic of DC offset. At time $T_1$, the DC offset correction sequence begins wherein the AGC is set for maximum attenuation of the input signal and the binary search process begins. During the binary search (from time $T_1$ to $T_2$) the DC offset is seen to settle out so that I is approximately equal to $\bar{I}$ is approximately equal to zero. At time $T_3$, the AGC is set in a fast recovery mode to quickly move back to a setting at $T_4$ which permits an appropriate amount of gain in the amplifiers for normal operation, and the input signal is restored. The I and $\bar{I}$ signals are now seen to be symmetrical about the zero axis since the DC correction is completed.

While this chart shows the effect on the DC offset correction of the I signals, it will be clearly understood that the baseband Q signals behave in an entirely similar way under this process.

Figure 5:
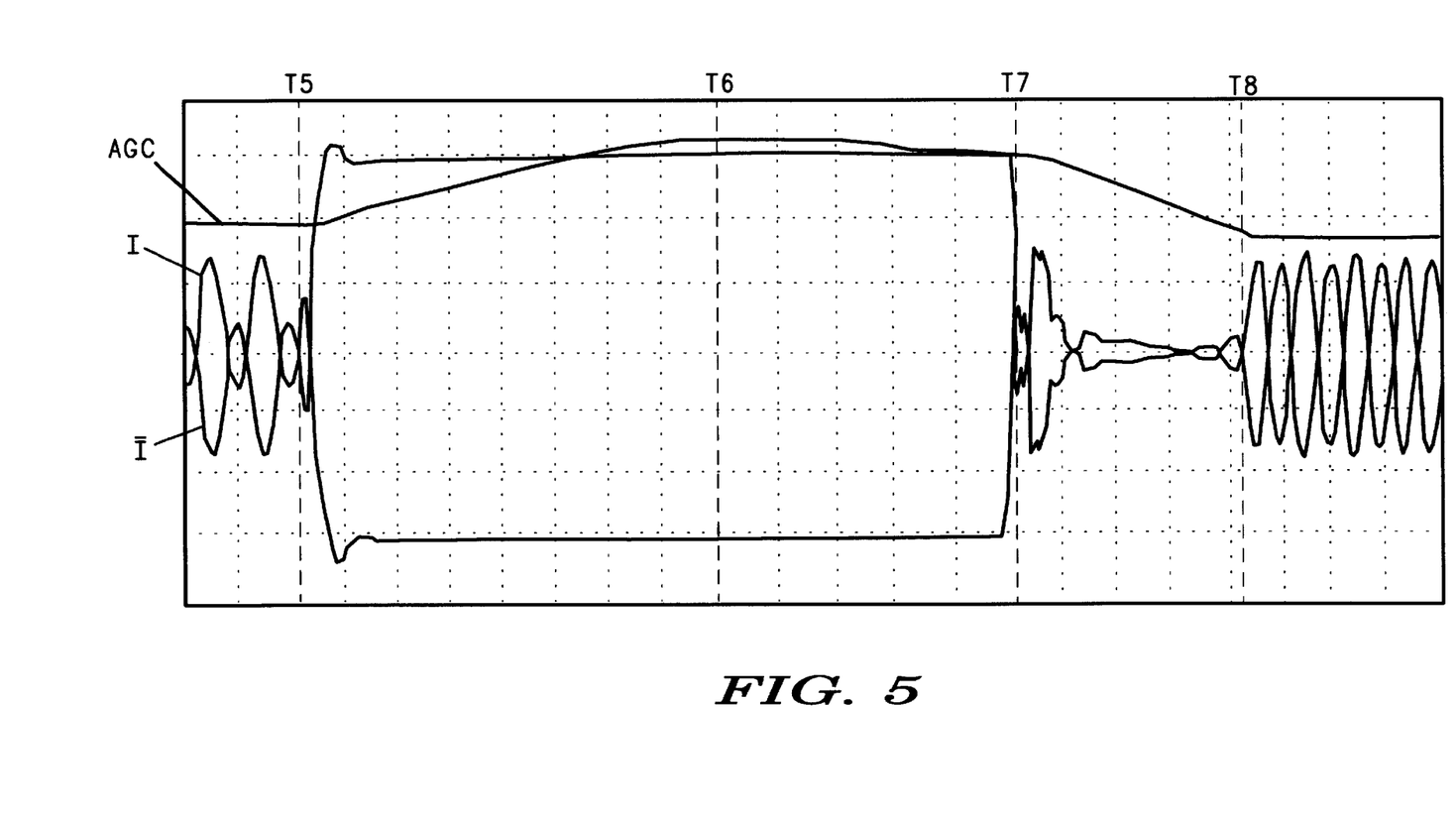
FIG. 5 shows a characteristic response for DCOCL and AGC for non-slotted receiver operation.

Turning now to FIG. 5, the characteristic response of the I and $\bar{I}$ signals undergoing a DCOCL DC voltage correction and the corresponding AGC response in a non-slotted protocol are illustrated. The AGC response is dependant (controlled by) the DCOCL response, which is selectable via the controller. In this example, the controller 236 sets the DCOCL to a specific (large) offset value at time $T_5$. Prior to this time, I and $\bar{I}$ are seen to again exhibit a DC offset, but the programmed value set by the controller 236 is rather large and results in an extreme divergence of the signals—perhaps railing the signals as shown. The AGC level is seen to rise indicating increasing attenuation between about $T_5$ and $T_6$. At time $T_7$, the DC offset correction process is initiated and carried out until approximately $T_8$. During this time, the system quickly converges to a point where the DC offset is corrected, while simultaneously, the AGC self corrects due to the nesting of the correction loops as previously described.

Thus, the present invention provides a sample and hold type DC baseband offset correction method which can be universally applied to ZIF and Direct Conversion receivers which is minimally disruptive of normal communications. The baseband DC offset correction is accomplished without the negative effects of the characteristic passband notch produced by continuously tracking out DC offset variations.

Those of ordinary skill in the art will recognize that the present invention has been described in terms of exemplary embodiments based upon use of a programmed controller. However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention. Moreover, while a specific overall architecture has been disclosed, the present invention may be utilized on other architectures without departing from the present invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications, equivalents and variations as fall within the scope of the appended claims.

What is claimed is:

1. A method of compensating for DC offset in a radio receiver, comprising:
    determining an initial DC offset of the receiver;
    implementing an initial DC offset correction to determine a DC offset correction value and produce a corrected DC offset;
    holding the DC offset correction value at a fixed value;
    determining the need to re-correct the DC offset of the receiver;
    determining an operational mode of the receiver; and
    implementing a DC offset correction using a technique compatible with the operational mode of the radio receiver, the technique being selected from one of a plurality of possible techniques.

2. The method of compensating DC offset in a radio receiver in accordance with claim 1, wherein the determining an operational mode of the receiver comprises determining if the receiver is operating under a slotted protocol or a non-slotted protocol.

3. The method of compensating DC offset in a radio receiver in accordance with claim 2, wherein if the receiver is operating in a non-slotted protocol, then implementing the DC offset correction is delayed until the receiver is receiving no on-channel carrier.

4. The method of compensating DC offset in a radio receiver in accordance with claim 2, wherein if the radio receiver is operating using a non-slotted protocol, then implementing the DC correction comprises:
    setting an AGC to a value which eliminates on-channel input signals;
    carrying out a DC offset correction process; and
    restoring normal AGC operation.

5. The method of compensating DC offset in a radio receiver in accordance with claim 2, wherein if the receiver is operating in a slotted protocol the method further comprises determining if an on-channel carrier cycles on and off under the slotted protocol.

6. The method of compensating DC offset in a radio receiver in accordance with claim 5, wherein if the slotted protocol cycles an on-channel carrier on and off, then implementing the DC offset correction is delayed until the on-channel carrier is cycled off and any off-channel carrier is attenuated.

7. The method of compensating DC offset in a radio receiver in accordance with claim 5, wherein if the protocol does not cycle the on-channel carrier on and off, then the on channel carrier is attenuated to a negligible value before implementing the DC offset correction.

8. The method of compensating DC offset in a radio receiver in accordance with claim 1, wherein determining the need to re-correct the DC offset of the receiver comprises determining if an average DC offset is greater than a threshold.

9. The method of compensating DC offset in a radio receiver in accordance with claim 8, wherein the average DC offset is computed by a technique selected in accordance with the operational protocol of the radio receiver.

10. The method of compensating DC offset in a radio receiver in accordance with claim 8, wherein the average DC offset is calculated by one or more techniques selected from simple integration, envelope averaging, slotted time averaging and weighted averaging.

11. The method of compensating DC offset in a radio receiver in accordance with claim 1, wherein if the radio receiver is operating using a slotted protocol, then implementing the DC offset correction comprises:
    presetting a DC offset correction; and
    allowing an AGC loop to respond while a DC offset correction loop corrects the DC offset.

12. An apparatus for compensating DC offset in a radio receiver, comprising:
    an automatic gain control (AGC) loop;
    a DC offset correction loop nested within the AGC loop;
    a controller which implements a DC offset correction sequence according to an operational protocol of the radio receiver, wherein:
        if the radio receiver is operating using a non-slotted protocol, the DC offset correction sequence comprises:
            presetting a DC offset correction; and
            allowing the AGC loop to respond while the DC offset correction loop corrects the DC offset;
    and wherein:
        if the radio receiver is operating using a slotted protocol, the DC correction sequence comprises:
            setting the AGC to a value which eliminates on-channel input signals;
            carrying out a DC offset correction process; and
            restoring normal AGC operation.

13. An apparatus for compensating DC offset in a radio receiver, comprising:
    an automatic gain control (AGC) loop;
    a DC offset correction loop nested within the AGC loop;
    a controller which implements a first DC offset correction sequence in the event the radio is operating according to a non-slotted protocol, and implements a second DC offset correction sequence in the event the radio is operating according to a slotted protocol.

14. The apparatus for compensating DC offset in a radio receiver in accordance with claim 13, wherein if the radio receiver is operating using a non-slotted protocol, the first DC offset correction sequence comprises:
    presetting a DC offset correction; and
    allowing the AGC loop to respond while the DC offset correction loop corrects the DC offset.

15. The apparatus for compensating DC offset in a radio receiver in accordance with claim 13, wherein if the radio receiver is operating using a slotted protocol, the second DC correction sequence comprises:
    setting the AGC to a value which eliminates on-channel input signals;
    carrying out a DC offset correction process; and
    restoring normal AGC operation.

16. The apparatus for compensating DC offset in a radio receiver in accordance with claim 13 further comprising a digital signal processor which computes an average DC offset using one or more techniques selected from simple integration, envelope averaging, slotted time averaging and weighted averaging.

17. The apparatus for compensating DC offset in a radio receiver in accordance with claim 16, wherein the average DC offset value is represented by a multi-bit digital signal having a least significant bit, and wherein the threshold is selected to be two times the DC value represented by the signal's least significant bit.

18. The apparatus for compensating DC offset in a radio receiver in accordance with claim 13, further comprising a digital signal processor which computes an average DC offset; and
   wherein the controller implements one of the first and second DC offset correction sequences when the average DC offset exceeds a threshold.

19. A method for compensating DC offset in a radio receiver which operates using a non-slotted communication protocol, comprising:
   providing an automatic gain control (AGC) loop;
   providing a DC offset correction loop nested within the AGC loop;
   implementing a DC offset correction sequence which comprises:
      presetting a DC offset correction; and
      allowing the AGC loop to respond while the DC offset correction loop corrects the DC offset.

20. A method for compensating DC offset in a radio receiver which operates using a slotted communication protocol, comprising:
   providing an automatic gain control (AGC) loop;
   providing a DC offset correction loop nested within the AGC loop;
   implementing a DC offset correction sequence which comprises:
      setting the AGC to a value which eliminates on-channel input signals;
      carrying out a DC offset correction process; and
      restoring normal AGC operation.

21. An apparatus for compensating DC offset in a radio receiver which operates using a non-slotted communication protocol, comprising:
   an automatic gain control (AGC) loop;
   a DC offset correction loop nested within the AGC loop;
   a controller which implements a DC offset correction sequence, the sequence comprising:
      presetting a DC offset correction; and
      allowing the AGC loop to respond while the DC offset correction loop corrects the DC offset.

22. An apparatus for compensating DC offset in a radio receiver which operates using a slotted communication protocol, comprising:
   an automatic gain control (AGC) loop;
   a DC offset correction loop nested within the AGC loop;
   a controller which implements a DC offset correction sequence, the sequence comprising:
      setting the AGC to a value which eliminates on-channel input signals;
      carrying out a DC offset correction process; and
      restoring normal AGC operation.

* * * * *